United States Patent [19]
Mino

[11] Patent Number: 5,592,070
[45] Date of Patent: Jan. 7, 1997

[54] BATTERY CHARGER HAVING A TEMPERATURE SENSOR AND A RECHARGEABLE BATTERY CHARGING METHOD

[75] Inventor: Takayuki Mino, Mihara-gun, Japan

[73] Assignee: Sanyo Electric Co., Ltd., Osaka, Japan

[21] Appl. No.: 377,094

[22] Filed: Jan. 23, 1995

[30] Foreign Application Priority Data

Jan. 28, 1994 [JP] Japan .................................. 6-008449

[51] Int. Cl.⁶ ............................. H02J 7/04; H01M 10/44
[52] U.S. Cl. .................................. 320/35; 320/21
[58] Field of Search ............................ 320/35, 21, 22, 320/23

[56] References Cited

U.S. PATENT DOCUMENTS 3,969,665  7/1976  Rowas ........................... 320/35
4,317,075  2/1982  Guerbet ......................... 320/35 X
4,775,827  10/1988  Ijntema et al. ............... 320/35 X
5,519,302  5/1996  Mino et al. ................... 320/21

FOREIGN PATENT DOCUMENTS 60-131036  7/1985  Japan.

*Primary Examiner*—Peter S. Wong
*Assistant Examiner*—Patrick B. Law
*Attorney, Agent, or Firm*—Wenderoth, Lind & Ponack

[57] ABSTRACT

A temperature sensor avoids battery charger over-heating when rechargeable batteries are charged In succession. The battery charger is provided with a control means having a voltage detection section and a control circuit. The control circuit stops charging when a rechargeable battery reaches full charge. The control means also has a temperature sensor to determine the temperature of heat producing elements in the power supply circuit. Charging current is reduced when the temperature of heat generating elements exceeds a specified temperature. Full charge detection is suspended when charging current is reduced to avoid false detection.

23 Claims, 5 Drawing Sheets

BATTERY CHARGER HAVING A TEMPERATURE SENSOR AND A RECHARGEABLE BATTERY CHARGING METHOD

BACKGROUND OF THE INVENTION

This invention relates to a rechargeable battery charger and charging method, and more particularly to a battery charger and charging method that prevents thermal run-away by reducing charging current when the temperature rises in heat producing elements of the power supply circuit during rapid charging.

The temperature of heat producing elements in the power supply circuit of a battery charger performing rapid charging of a rechargeable battery can become abnormally high. Particularly when a plurality of rechargeable batteries are rapidly charged in succession, the temperature of the heat producing elements gradually increases. Heat producing elements in the power supply circuit include the output transformer, bipolar output transistors, Field Effect (FET) output transistors, and rectifying diodes etc. These heat producing elements are attached to heat sinks in heat dissipating configurations to avoid abnormal temperature rise. The heat dissipating capacity of a heat sink is designed considering the amount of heat produced and the external temperature. The temperature rise of heat producing elements in the power supply circuit can be reduced by enlarging the heat sinks to increase their dissipating capacity. However, larger heat sinks result in higher parts cost. Further, it is difficult to fit large heat sinks inside a small case. To design a low-cost compact battery charger, small heat sinks are needed.

Heat sinks for power supply heat producing elements are designed to prevent abnormal temperature rise under normal operating conditions. However, as shown in FIG. 1, the amount of heat generation can exceed the amount of heat dissipation resulting in abnormal temperature rise when rechargeable batteries are charged successively. This problem can be solved by designing larger heat sinks. But, since large heat sinks have the drawbacks noted previously, there is a limit to heat sink size.

If a battery charger is operated when the temperature of heat producing elements in the power supply circuit has risen abnormally high, thermal run-away and failure can result. To prevent this, prior art battery chargers contain a thermal protection circuit. A device such as a temperature fuse or non-resetting relay is used in the thermal protection circuit to cut-off the output circuit.

Thermal run-away due to excessive temperature rise in power supply heat producing elements can be prevented in a battery charger containing a thermal protection circuit. However, a thermal protection circuit that uses a temperature fuse or non-resetting relay has the drawback that rechargeable battery charging is interrupted and full charge cannot be attained when the power supply circuit output is cut-off due to excessive temperature rise in its heat producing elements.

To overcome this problem, a power supply can be designed with a resetting thermal protection circuit which temporarily stops charging when the temperature of the heat producing elements rises excessively and resumes charging after they have cooled to a set temperature. However, a battery charger that resets its thermal protection circuit and resumes charging has the drawback that the rechargeable battery cannot be charged while the heat producing elements are cooling and charging time becomes lengthy. Further, a battery charger which activates a thermal protection circuit also has the drawback that the rechargeable battery voltage drops from its peak value when charging is interrupted giving a false indication of full charge. A rechargeable battery which has been falsely determined to be fully charged will not be charged further even after the heat producing elements in the power supply circuit have cooled. In this case the battery cannot be fully charged.

The present invention was developed for the purpose of overcoming these drawbacks. It is thus a primary object of the present invention to provide a battery charger having a temperature sensor that can continuously charge rechargeable batteries to full charge without interruption while effectively preventing excessive temperature rise and thermal run-away in the heat producing elements of the power supply circuit.

SUMMARY OF THE INVENTION

The battery charger of this invention comprises a control means to control the charging state of the rechargeable battery. The control means is provided with a voltage detection section to determine the battery voltage and a control circuit to perform computations with that battery voltage and control rechargeable battery charging. The control means is organized to determine battery voltage with the voltage detection section, determine full charge with the control circuit by performing computations on the battery voltage, and stop charging with the control circuit when full charge has been reached.

In addition, the battery charger of this invention comprises a temperature sensor in the control means to determine the temperature of the heat producing elements in the power supply circuit. The temperature sensor does not measure the temperature of the rechargeable battery under charge, but rather measures the temperature of the power supply's heat producing elements. If the temperature of the heat producing elements reaches a set temperature, the control circuit reduces the charging current to the rechargeable battery. When the control circuit reduces charging current to the rechargeable battery, the system is configured to stop detection of full battery charge.

The heat producing elements in the power supply circuit are those elements In the power supply intended for battery charging. For example, those elements include the output transformer, bipolar output transistors, Field Effect (FET) output transistors, and rectifying diodes etc. The temperature of these elements is measured by the temperature sensor.

DETAILED DESCRIPTION OF THE INVENTION

The battery charger of this invention has a temperature sensor which determines the temperature of heat producing elements in the power supply circuit. When rechargeable battery charging current is large, temperature rises due to heat generation in power supply circuit elements such as the output transformer and output transistors. If the temperature of these heat producing elements in the power supply circuit rises abnormally high, thermal run-away and system failure can result. Therefore, when heat producing element temperature rises to a set value, it is detected by the temperature sensor. The control circuit performs computations on the signal from the temperature sensor, and when the temperature of the heat producing elements exceeds the set temperature, the control circuit reduces charging current to the rechargeable battery. When charging current is reduced, the load on the charging power supply decreases, and the temperature of the heat producing elements in the power supply circuit gradually decreases.

When the control means switches to reduced rechargeable battery charging current due to temperature rise in the power supply heat producing elements, the control circuit can mistakenly assume that the battery has reached full charge and stop charging. This is because the control circuit of the control means determines full charge by detecting a peak battery voltage or a $-\Delta V$ voltage drop from the peak battery voltage.

The battery charger of this invention avoids this pitfall and charges the rechargeable battery to full charge. When the temperature of the power supply heat producing elements becomes excessively high and charging current is reduced, the control circuit cancels full charge detection.

Once the control circuit cancels full charge detection, it can, for example, resume battery voltage and full charge detection after a prescribed time interval has passed since charging current reduction.

The following describes an embodiment of the present invention based on the illustrations. However, the following embodiment is for the purpose of presenting a concrete example of the technology of the present invention and the battery charger of this invention is not limited to the following embodiment.

Figure 1:
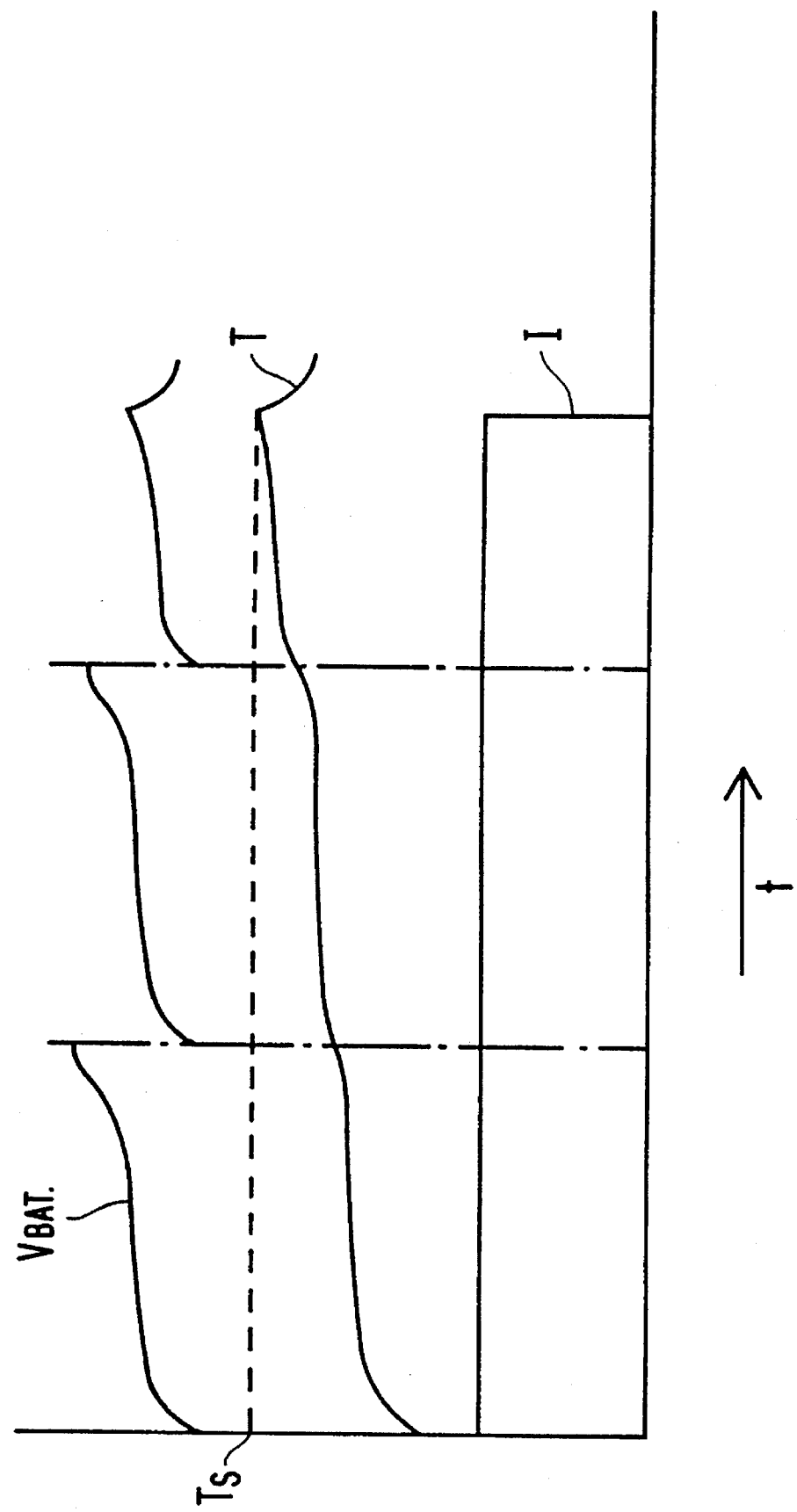
FIG. 1 is a graph showing the time dependence during rechargeable battery charging of battery voltage, charging current, and temperature of heat producing elements that make up the power supply circuit for a prior art battery charger having a temperature sensor.
Figure 2:
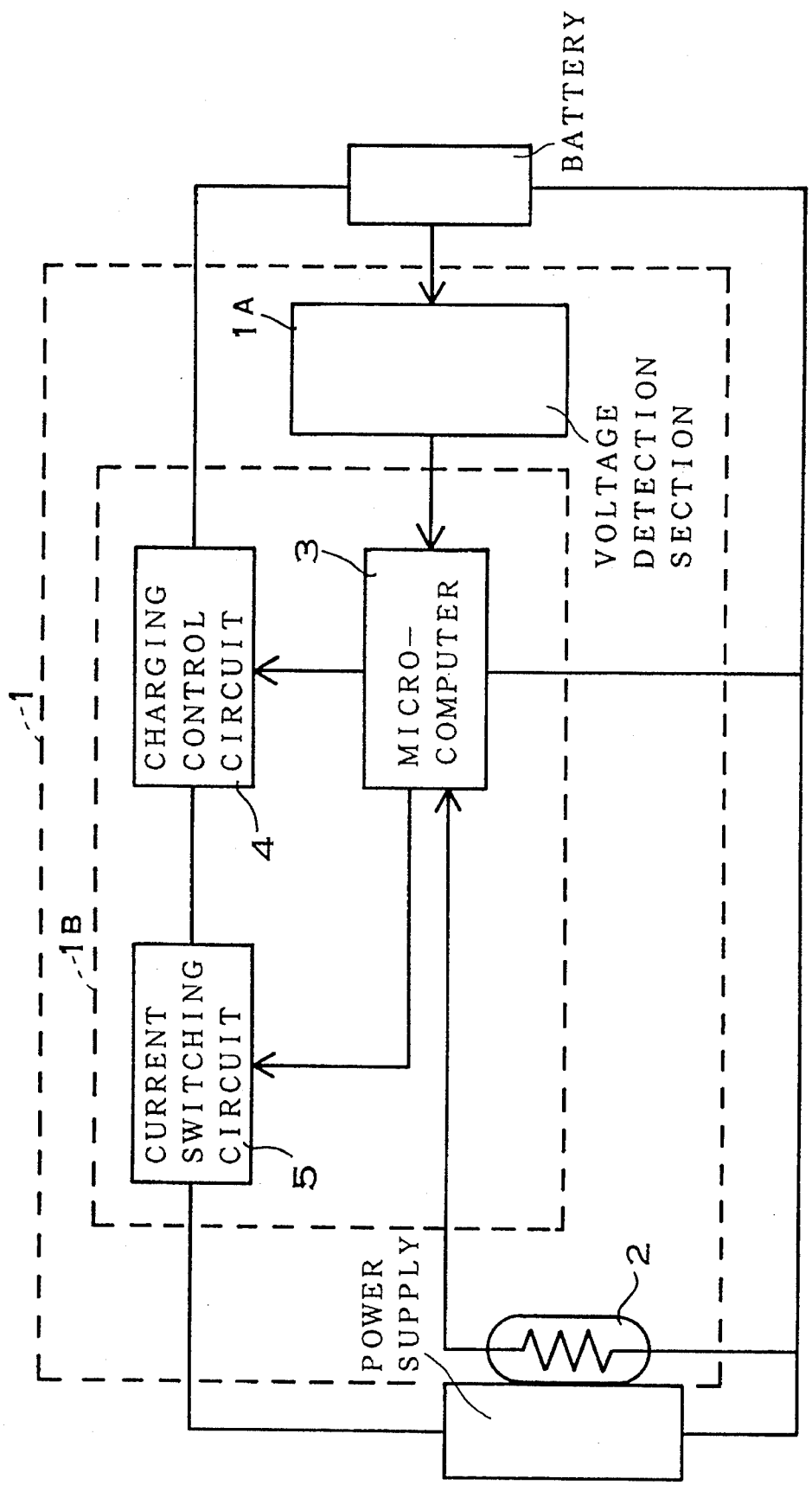
FIG. 2 is a block diagram showing an embodiment of the battery charger of the present invention.

Turning to FIG. 2, the battery charger having a temperature sensor shown is provided with a control means 1 to control rechargeable battery charging. The control means 1 stops charging or switches to trickle charging when a rechargeable battery reaches full charge. The control means 1 also reduces the charging current and suspends full charge detection when the temperature of heat producing elements in the power supply circuit rises abnormally high. The control means 1 comprises a voltage detection section 1A to determine the battery voltage, and a control circuit 1B to perform computations on the voltage found by the voltage detection section 1A and control rechargeable battery charging.

The control means 1 measures battery voltage with the voltage detection section 1A, detects full battery charge by performing computations on the measured voltage with the control circuit 1B, and stops charging with the control circuit 1B when a rechargeable battery reaches full charge.

The control circuit 1B is provided with a micro-computer 3 to perform computations on the signal from the voltage detection section 1A to determine full battery charge, a charging control circuit 4 to stop charging or switch to trickle charging when a rechargeable battery is fully charged, a temperature sensor 2 to measure the temperature of heat producing elements in the power supply circuit, and a current switching circuit 5 to reduce charging current under control of the micro-computer 3 when the temperature of power supply heat producing elements becomes greater than or equal to a set temperature.

Figure 3:
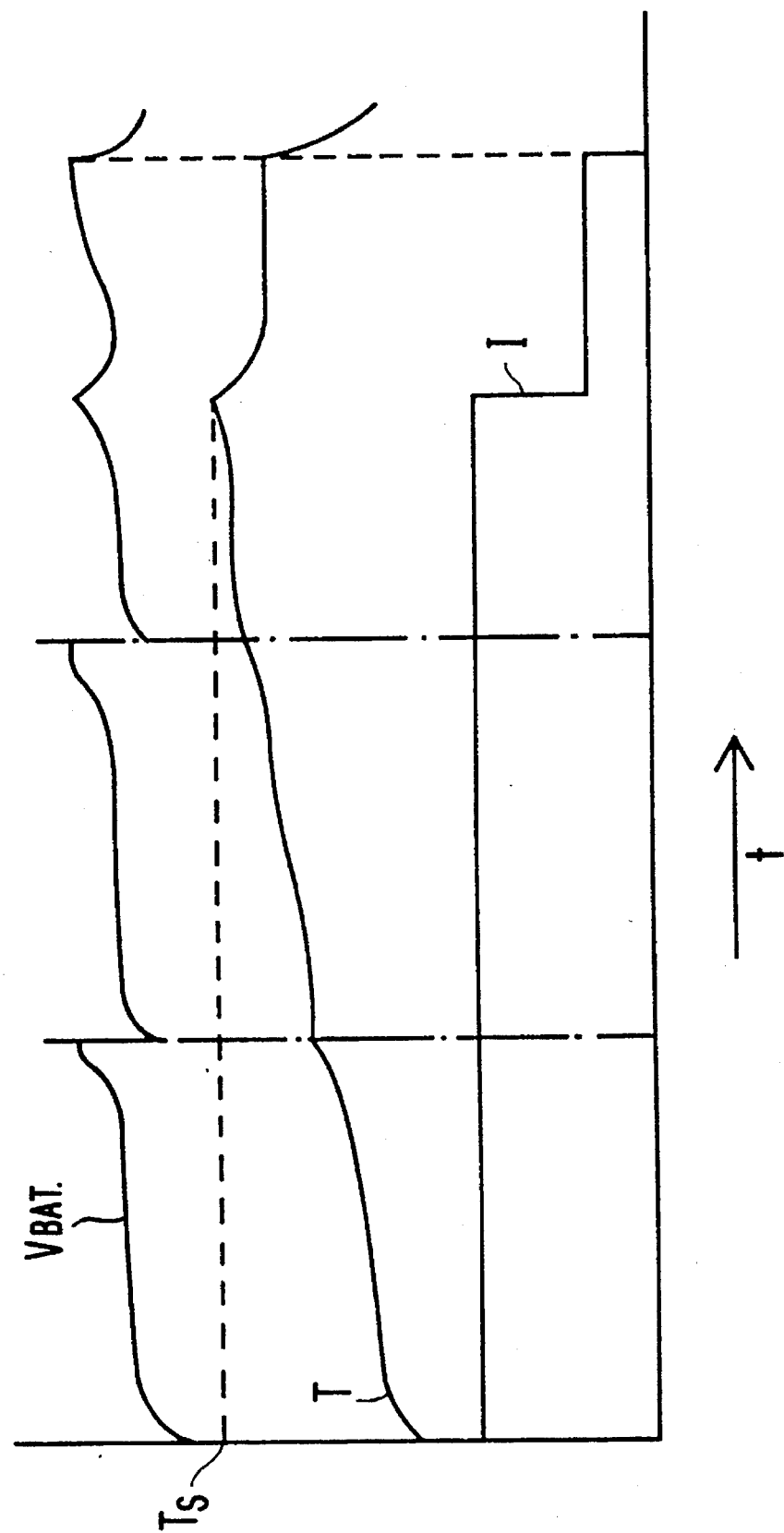
FIG. 3 is a graph showing the time dependence during rechargeable battery charging of battery voltage, charging current, and temperature of heat producing elements for a battery charger having a temperature sensor of the present invention.

The micro-computer 3 determines that a rechargeable battery is fully charged when its voltage peaks or drops by an amount $-\Delta V$ from the peak value. The micro-computer 3 then ends charging by controlling the charging control circuit 4 to stop charging or switch to trickle charging. The micro-computer 3 also compares the temperature signal input from the temperature sensor 2 with a set value to control the current switching circuit 5. As shown in FIG. 3, when the temperature signal input to the micro-computer from the temperature sensor 2 becomes greater than a specified temperature, the micro-computer 3 controls the current switching circuit 5 to reduce the rechargeable battery charging current below its normal value.

When rechargeable battery current is reduced, battery terminal voltage also drops. If the micro-computer 8, which determines full battery charge by detecting a $-\Delta V$ drop, detects a battery terminal voltage drop, it will judge the battery to be fully charged and control the charging control circuit 4 to stop charging. In this situation, the rechargeable battery will not reach full charge.

To avoid this pitfall in the battery charger of the present invention, the micro-computer 3 cancels determination of full battery charge at the same time it controls the current switching circuit 5 to reduce rechargeable battery current. As shown in FIG. 3, rechargeable battery voltage gradually drops over a certain time interval when charging current is reduced. The micro-computer 3 cancels full charge detection for that time interval in which battery voltage drops. The micro-computer 3 measures the interval over which full charge detection is canceled with its internal timer function. The internal timer is set, for example, to approximately 30 min. The timer may, however, be set anywhere in the range of 15 min. to 50 min. If the timer interval is set too short, the micro-computer 3 may detect a $-\Delta V$ drop when full charge detection is resumed, and mistakenly judge that the battery is fully charged. Further, if the timer interval is too long, the rechargeable battery may be over-charged.

In addition, the micro-computer 3 can measure battery voltage variation to adjust the interval during which full charge detection is cancelled. As shown in FIG. 3, when charging current is reduced, rechargeable battery voltage initially drops, then gradually rises to a peak voltage, and finally drops again by $-\Delta V$ at full charge. Therefore, the micro-computer 3 can cancel full charge detection during the initial voltage drop and then resume full charge detection when the voltage again begins to rise.

The temperature sensor 2 is installed on heat producing elements that make up the power supply circuit of the battery charger. Of the heat producing elements used in the power supply circuit, the output stage bipolar transistors particularly need thermal run-away protection. In a battery charger output stage that uses FET's in place of bipolar transistors, the FET's need particular protection. Therefore, the temperature sensor 2 is preferably fixed to the power supply circuit's heat producing output bipolar transistors or FET's.

Controlling rechargeable battery current by attaching the temperature sensor 2 to the output bipolar transistors or FET's has the feature that output stage bipolar transistor or FET thermal run-away can be effectively prevented. However, the output bipolar transistors and FET's are not the only heat producing elements in the power supply circuit. Since the output transformer, rectifying diodes, and other elements also generate heat, the temperature sensor 2 can also be installed on these elements.

Further, although a single temperature sensor 2 is normally used, a plurality of temperature sensors 2 can also be fixed to a plurality of heat producing elements in the power supply circuit. A plurality of temperature sensors 2 input the temperature of each heat producing element to the micro-computer 3. The micro-computer 3 has specified temperatures set for each different heat generating element in the power supply circuit and switches to reduced charging current when the temperature of any element exceeds its specified temperature.

Figure 4:
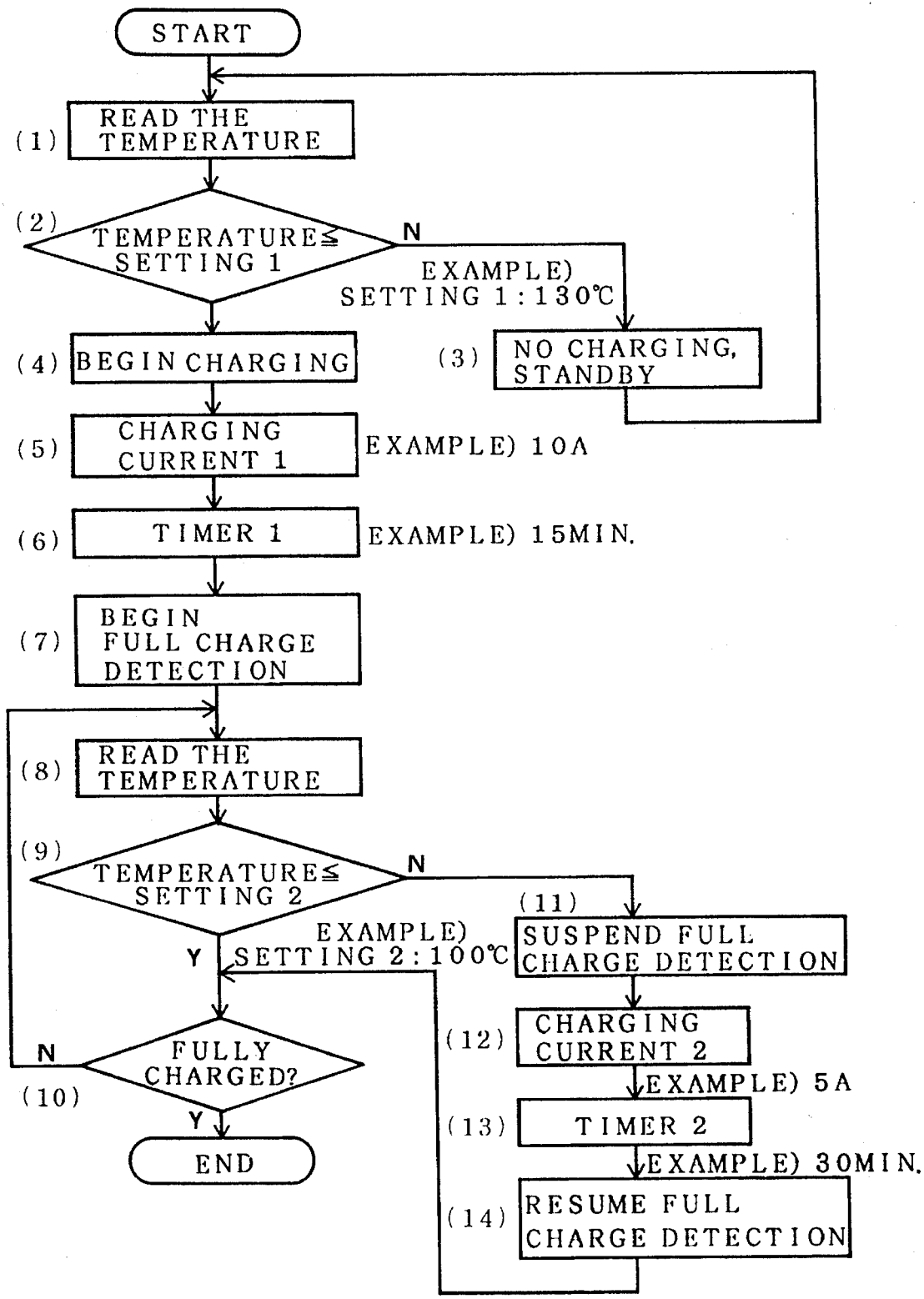
FIG. 4 is a flow-chart of rechargeable battery charging with the battery charger shown in FIG. 2.

The battery charger shown in FIG. 2 charges a rechargeable battery by the following steps according to the flow-chart of FIG. 4.

(1) The temperature sensor 2 measures the temperature of heat producing elements in the power supply circuit and inputs it to the micro-computer 3.

(2) The micro-computer 3 of the control circuit 1B compares the input temperature signal with setting 1. For example, setting 1 is specified to be 130° C.

(3) If the temperature signal input from the temperature sensor 2 is greater than the 130° C. of setting 1, charging is not started and the battery charger is put in standby. Steps (1), (2), and (3) are looped through until signal input from the temperature sensor 2 drops below the 130° C. of setting 1.

(4) If the temperature signal input from the temperature sensor 2 is below setting 1, the micro-computer 3 controls the charging control circuit 4 to begin charging.

(5) The micro-computer 3 controls the current switching circuit 5 to use charging current 1. For example, charging current 1 is set to 10A as shown in FIG. 4.

(6) Count down from the setting of timer 1 is started. For example, the interval of timer 1 is set to 15 min. Timer 1 is provided to prevent the micro-computer 3 from falsely detecting full battery charge, which can occur immediately after charging is started.

(7) When the timer 1 interval is up, the micro-computer 3 begins full charge detection. Micro-computer 3 determines full battery charge by detecting a peak rechargeable battery voltage or a $-\Delta V$ drop in voltage.

(8) The temperature sensor 2 inputs power supply circuit heat producing element temperature to the micro-computer 3. In other words, the micro-computer 3 begins reading-in the temperature of the heat producing elements.

(9) The micro-computer 3 compares the temperature signal with setting 2. The temperature signal is the input from temperature sensor 2 that detects the temperature of heat producing elements in the power supply circuit. For example, temperature of setting 2 is specified to be 100° C.

(10) If the temperature of the heat producing elements in the power supply circuit is less than or equal to setting 2, the micro-computer 3 operates on the detected battery voltage to determine if the battery is fully charged. If the battery is fully charged, the micro-computer 3 controls the charging control circuit 4 to end charging. If the rechargeable battery is not fully charged, steps (8), (9), and (10) are looped through until full charge is reached.

(11) If the temperature off heat producing elements in the power supply circuit is greater than setting 2 in step (9), the micro-computer 3 suspends full charge detection.

(12) The micro-computer 3 controls the current switching circuit 5 to switch to charging current 2. For example, charging current 2 is set to 5A.

(13) Count down from the setting of timer 2 is started. For example, the interval of timer 2 is set to 30 min. As shown in FIG. 3, if the temperature of heat producing elements in the power supply circuit becomes greater than the specified temperature and charging current is reduced, rechargeable battery voltage drops. If the micro-computer 3 determines full charge from the battery voltage at this time, it will falsely determine full charge. To prevent false determination of full charge, the micro-computer 3 suspends full charge detection for a given time interval.

(14) When the timer 2 interval is up, the micro-computer 3 resumes full charge detection.

Subsequently, steps (10), (8), (9), (11), (12), (13), and (14) are looped through to Fully charge the rechargeable battery. When these steps are looped through, charging is ended if the battery is fully charged, and steps (8), (9), and (10) are looped through until full charge if the temperature of heat producing elements in the power supply circuit drops below setting 2.

In the steps of the battery charging flow-chart of FIG. 4, charging current is reduced if the temperature of heat producing elements in the power supply circuit is rising. Specifically, if the temperature of heat producing elements is greater than setting 2, steps (9), (11), (12), (13), and (14) are looped through to fully charge the rechargeable battery. When another rechargeable battery is to be charged in succession after battery charging with heat producing element temperature greater than setting 2, it can be charged by the flow-chart of FIG. 5. The switch-over from one flow-chart to another is accomplished by micro-computer 3 storage of the loop traversed during the previous battery charging. A rechargeable battery is charged by the following steps according to the flow-chart shown in FIG. 5.

(1) The temperature sensor 2 measures the temperature of heat producing elements in the power supply circuit and inputs it to the micro-computer 3.

(2) The micro-computer 3 compares the input temperature signal with setting 3. For example, setting 3 is specified to be 120° C.

(3) If the temperature signal input from the temperature sensor 2 is greater than the 120° C. setting 3, charging is not started and the battery charger is in standby. Steps (1), (2), and (3) are looped through until the temperature signal input from the temperature sensor 2 drops below the 120° C. setting 3.

(4) If the temperature signal from the temperature sensor 2 is lower than setting 3, the micro-computer 3 compares the temperature signal with setting 4. For example, setting 4 is specified to be 80° C.

(5) If the temperature signal input from the temperature sensor 2 is lower than setting 4, the micro-computer 3 controls the charging control circuit 4 to begin charging and the current switching circuit 5 to use charging current 1. For example, charging current 1 is set to 10A in FIG. 5.

(6) Count down from the setting of timer 1 is started. For example, the interval of timer 1 is set to 15 min. Timer 1 is provided to prevent the micro-computer 3 from falsely detecting full battery charge, which can occur immediately after charging is started.

(7) The micro-computer 3 operates on the measured battery voltage to determine whether or not full charge has been reached. If the battery is fully charged, the micro-computer 3 controls the charging control circuit 4 to end charging. If the battery is not fully charged, this step is looped through until the rechargeable battery is fully charged.

(8) If the temperature of power supply circuit heat producing elements is higher than setting 4, the micro-computer 3 controls the charging control circuit 4 and the current switching circuit 5 to switch to charging current 2 and begin charging. For example, charging current 2 is set to 5A.

(9) Count down from the setting of timer 2 is started. For example, the interval of timer 2 is set to 30 min. The micro-computer 3 suspends full charge detection until timer 2 has completed its count down. When the 30 min. timer 2 interval is up, control jumps to step (7) and the micro-computer 3 determines whether or not full charge has been reached. Subsequently, the charging current remains unchanged until the battery is fully charged, at which point charging is ended.

Figure 5:
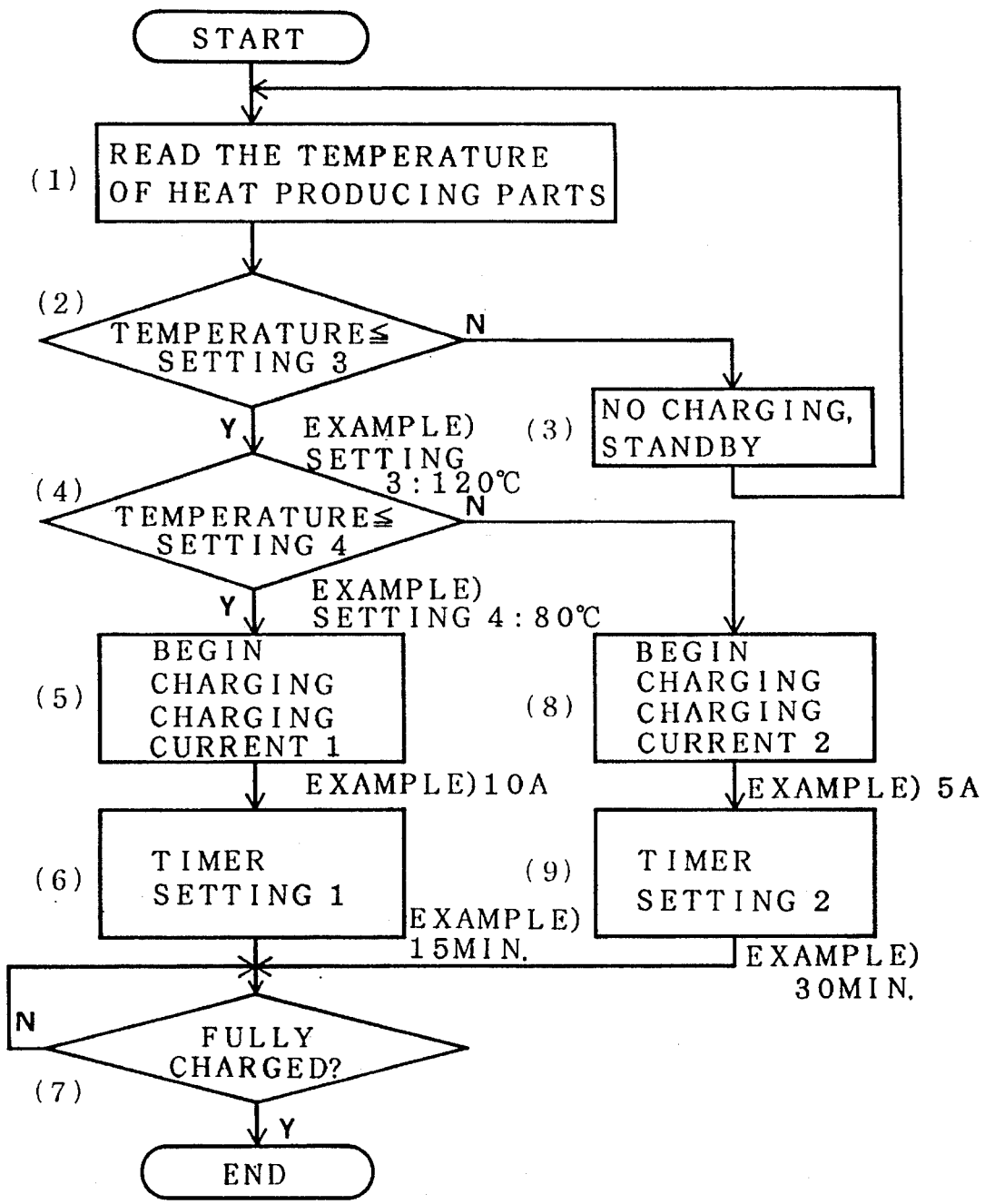
FIG. 5 is a flow-chart of rechargeable battery charging with the battery charger shown in FIG. 2.

The flow-chart of FIG. 5 describes charging of a plurality of rechargeable batteries where the charging current is reduced from the start when the temperature of heat producing elements in the power supply circuit is higher than the specified temperature.

What is claimed is:

1. A battery charger having a temperature sensor comprising:
   (a) a power supply circuit with heat producing elements;
   (b) a control means connected between the power supply circuit and a rechargeable battery to control rechargeable battery charging; and the control means comprising:
      (1) a voltage detection section to determine battery voltage;
      (2) a temperature sensor to determine the temperature of heat producing elements in the power supply circuit; and
      (3) a control circuit to operate on the voltage detected by the voltage detection section and control rechargeable battery charging, to stop charging when the rechargeable battery reaches full charge, to operate on the signal input from the temperature sensor to determine the temperature of heat producing elements in the power supply circuit, to reduce rechargeable battery charging current when the detected temperature becomes greater than or equal to a specified temperature, and to suspend detection of full rechargeable battery charge when the charging current is reduced.

2. A battery charger having a temperature sensor as recited in claim 1 wherein the control circuit is provided with a micro-computer.

3. A battery charger having a temperature sensor as recited in claim 2 wherein the micro-computer is provided with a timer to measure the time interval over which full rechargeable battery charge detection is suspended.

4. A battery charger having a temperature sensor as recited in claim 1 wherein the heat producing elements are output transistors.

5. A battery charger having a temperature sensor as recited in claim 4 wherein the heat producing elements are output Field Effect Transistors (FET's).

6. A battery charger having a temperature sensor as recited in claim 1 wherein the heat producing element is an output transformer.

7. A battery charger having a temperature sensor as recited in claim 1 wherein the heat producing elements are rectifying diodes.

8. A battery charger having a temperature sensor as recited in claim 1 wherein the control means is provided with a plurality of temperature sensors.

9. A rechargeable battery charging method comprising:
   (a) detecting battery voltage with a voltage detection section;
   (b) detecting the temperature of heat producing elements in a power supply circuit with a temperature sensor; and
   (c) with a control circuit, operating on the detected battery voltage to stop charging when a rechargeable battery reaches full charge, operating on the signal detected from the temperature sensor to reduce rechargeable battery charging current when the temperature detected by the temperature sensor becomes greater than or equal to a specified temperature, and suspending rechargeable battery full charge detection when the charging current is reduced.

10. A rechargeable battery charging method as recited in claim 9 wherein the specified temperature for the control circuit to reduce rechargeable battery charging current is 100° C.

11. A rechargeable battery charging method as recited in claim 9 wherein the specified temperature for the control circuit to reduce rechargeable battery charging current is 80° C.

12. A rechargeable battery charging method as recited in claim 9 wherein the temperature sensor detects output transistor temperature.

13. A rechargeable battery charging method as recited in claim 9 wherein the temperature sensor detects output Field Effect Transistor (FET) temperature.

14. A rechargeable battery charging method as recited in claim 9 wherein the temperature sensor detects output transformer temperature.

15. A rechargeable battery charging method as recited in claim 9 wherein the temperature sensor detects rectifying diode temperature.

16. A rechargeable battery charging method as recited in claim 9 wherein temperature sensors detect the temperature of a plurality of heat producing elements in the power supply circuit.

17. A rechargeable battery charging method as recited in claim 9 wherein the time interval over which rechargeable battery full charge detection is suspended when the temperature detected by the temperature sensor is greater than or equal to the specified temperature and charging current is reduced is 15 min. to 50 min.

18. A rechargeable battery charging method as recited in claim 17 wherein the time interval over which rechargeable battery full charge detection is suspended when the temperature detected by the temperature sensor is greater than or equal to the specified temperature and charging current is reduced is 30 min.

19. A rechargeable battery charging method as recited in claim 9 wherein the charging current is reduced and full charge detection is suspended when the temperature detected by the temperature sensor is greater than or equal to the specified temperature, and full charge detection is resumed when rechargeable battery voltage rises while in the reduced charging current state.

20. A rechargeable battery charging method as recited in claim 9 wherein charging of a fully charged rechargeable battery is stopped making the charging current zero.

21. A rechargeable battery charging method as recited in claim 9 wherein charging of a fully charged rechargeable battery is stopped switching to trickle charging.

22. A rechargeable battery charging method as recited in claim 9 wherein rechargeable battery charging current is reduced by one half when the temperature detected by the temperature sensor is greater than or equal to the specified temperature.

23. A rechargeable battery charging method as recited in claim 9 wherein the temperature detected by the temperature sensor is compared to the specified temperature the first thing after charging is started, and when the detected temperature is greater than or equal to the specified temperature charging is put on standby until the temperature drops below the specified temperature.

* * * * *